United States Patent

Van Tol

[11] 3,918,057
[45] Nov. 4, 1975

[54] CIRCUIT ARRANGEMENT FOR THE IDENTIFICATION OF VEHICLES

[75] Inventor: Nicolaas Van Tol, Hilversum, Netherlands

[73] Assignee: U.S. Philips Corporation, New York, N.Y.

[22] Filed: Jan. 16, 1974

[21] Appl. No.: 433,770

[30] Foreign Application Priority Data
Feb. 28, 1973 Netherlands.................. 7302764

[52] U.S. Cl...... 343/6.8 R; 343/6.5 SS; 343/6.8 LC
[51] Int. Cl.² ........................................... G01S 9/56
[58] Field of Search ........ 343/6.5 SS, 6.8 LC, 6.8 R

[56] References Cited
UNITED STATES PATENTS

| | | | |
|---|---|---|---|
| 2,548,813 | 4/1951 | Perkins et al. | 343/6.8 R |
| 3,092,830 | 6/1963 | Clock et al. | 343/6.8 R |
| 3,299,424 | 1/1967 | Vinding | 343/6.5 SS |
| 3,341,845 | 9/1967 | Deman | 343/6.8 LC X |
| 3,341,846 | 9/1967 | McMurren et al. | 343/6.8 LC |
| 3,389,391 | 6/1968 | Keeler et al. | 343/6.8 R |

*Primary Examiner*—Malcolm F. Hubler
*Attorney, Agent, or Firm*—Frank R. Trifari; Daniel R. McGlynn

[57] ABSTRACT

A vehicle identification circuit arrangement with battery power supply in which the transmitting oscillator of a reply station which is modulated according to an identification code is normally cut off and starts to oscillate in reaction to an interrogation signal, the power supply for the remainder of the circuit then being switched on via a gate.

3 Claims, 3 Drawing Figures

CIRCUIT ARRANGEMENT FOR THE IDENTIFICATION OF VEHICLES

The invention relates to a circuit arrangement for the identification of vehicles, notably vehicles which are not bound to rails.

So as to achieve increased flexibility, modern traffic control systems require systems for the identification of given vehicles such as buses, fire-engines, ambulances, etc. It is thus possible to grant priority to given vehicles in the control of traffic lights.

Vehicle identification systems are already known which comprise a reply station which is arranged on the vehicle and which, upon reception of an interrogation signal transmitted by a stationary interrogation station, transmits, via a transmission oscillator, a signal which is modulated according to a code series which characterizes the reply station, the said code being generated by a logic circuit.

For the identification of railway cars, the energy required for operating the reply station is commonly inductively transmitted by the interrogation station to the reply station via a wire loop.

For the identification of vehicles which are not bound to rails and which, consequently, do not follow a fixed trajectory, this kind of energy supply for the reply station cannot very well be realised in practice because the energy to be supplied by the interrogation station would have to be too high.

It would in principle be possible to derive the energy for the reply station from the already present accumulator of the vehicle itself. However, this has practical drawbacks because this implies an intervention in the electrical system of the vehicle.

The only practical solution is to provide the reply station with its own energy source in the form of a built-in battery. So as to ensure a long service life of the battery, for example 5 years, it is necessary to derive as little energy as possible from the battery and to ensure notably that the system is completely currentless in the rest state, ignoring a negligibly small leakage current which is unavoidable.

The invention provides a particularly practical solution to this problem.

In the device according to the invention, the power for the logic circuit in the reply station is supplied via a gate which is blocked in the rest state of the circuit. Furthermore, the transmission oscillator is adjusted such that it is currentless in its rest state and starts to oscillate upon reception of an interrogation signal from the interrogation station which has a value exceeding a given threshold value, means being provided which react thereto and which unblock the gate, and further means being provided for blocking the transmission oscillator and the gate again at the end of the code series.

Therefore, in this system the transmission oscillator also serves as a detector for the interrogation signal. The operation is based on the fact that, if the interrogation signal generates an alternating voltage in the oscillator circuit and a given amplitude threshold is exceeded, the transmission oscillator circuit amplifies the induced signal such that the oscillator continues to oscillate after the interrogation signal has disappeared.

The invention will be described in detail hereinafter with reference to the drawing.

Figure 1:
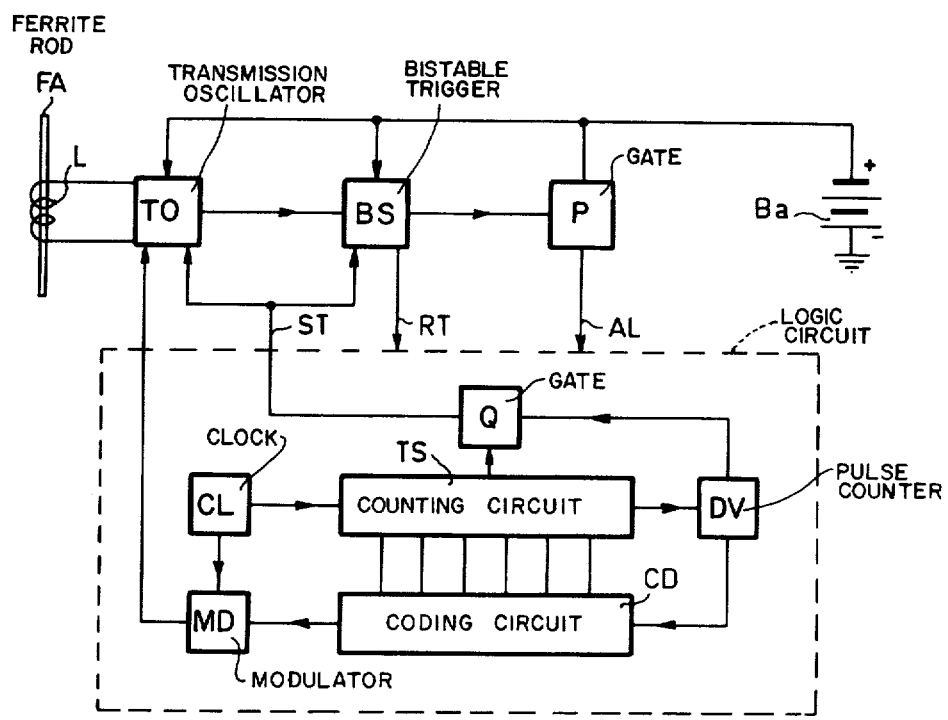
FIG. 1 is a diagrammatic representation of an embodiment of a reply station according to the invention.

The reply station shown in FIG. 1 comprises a transmission oscillator TO, a bistable trigger circuit BS, a gate P and a logic circuit LC which can be of conventional design.

The oscillator TO and the trigger BS are directly connected to the built-in supply battery Ba, while the power for logic circuit LC is supplied via the gate P which is controlled by the trigger BS such that the gate P is blocked in the rest state of the circuit and of the trigger BS.

The oscillator TO can in principle be of a known design, for example, a Hartley or Colpitts oscillator comprising an oscillatory circuit having an inductance L which consists of a ferrite rod FA provided with a winding. The oscillator furthermore comprises one or more transistors which are biassed such that the oscillator is blocked in the rest state, i.e. the transistors are then cut off.

The trigger BS is designed in known manner such that, at least in the rest state, it draws only an extremely small current which is negligible in practice.

Consequently, the battery Ba supplies substantially no current in the rest state.

Let us assume that the reply station comes within reach of an interrogation station.

The interrogation station periodically transmits, for example, 40 times per second, an interrogation signal during a short period of time, for example, 2 ms, the frequency of the interrogation signal corresponding to the tuning frequency of the oscillatory circuit of the oscillator TO, for example, 100 kHz.

Via the aerial FA, this interrogation signal induces an oscillation in the oscillatory circuit such that the cut off threshold of the transistor is exceeded and the transistor (or transistors) of the oscillator TO becomes conducting and the oscillation is amplified via the feedback present in the oscillator. The oscillator starts to oscillate and continues to do so after the interrogation signal has disappeared.

Under the influence of this oscillation or any direct voltage variation, the trigger BS is set to the active state, with the result that the gate P is unblocked and power is supplied to the logic circuit LC.

Upon the change-over to the active state, the trigger BS supplies a pulse, via the conductor RT, to the logic circuit LC, with the result that the latter is set to a given starting state if it were not already in this state.

The logic circuit comprises a clock pulse generator CL which subsequently periodically applies pulses to the counting circuit TS which co-operates with a coding circuit CD. The counter TS periodically completes a given cycle and at the same time senses the various sections of the coding circuit CD which are adjusted in accordance with the code to be formed. Each time when a given final position is reached, the counter applies a pulse to the pulse counter DV which can occupy four positions. The pulse counter furthermore controls the coding circuit CD such that in the first position a start code is formed which is the same for all reply stations, the recognition or identification code which is characteristic of the relevant reply station being formed in the second and third position, a stop code which is the same for all reply stations being formed in the fourth position.

The code series which is formed by way of the coding circuit CD is applied to the modulator MD which modulates the transmitting oscillator TO accordingly.

In the fourth position of pulse counter DV the counter TS applies a pulse, via gate Q and the conductor ST, to the trigger BS with the result that the trigger is returned to the rest position and blocks the gate P; this pulse also causes the blocking of the oscillator TO, for example, by damping the oscillatory circuit.

The start code is an indication for the interrogation station that the interrogation signal is answered. Parity characters are preferably assigned to the code series so that it can be investigated in the interrogation station whether or not a non-disturbed reply signal is received.

The bistable trigger can in principle be dispensed with. In that case the control voltage of the gate P can be derived, for example, directly via a rectifier from the oscillations of the oscillator.

Figure 2:
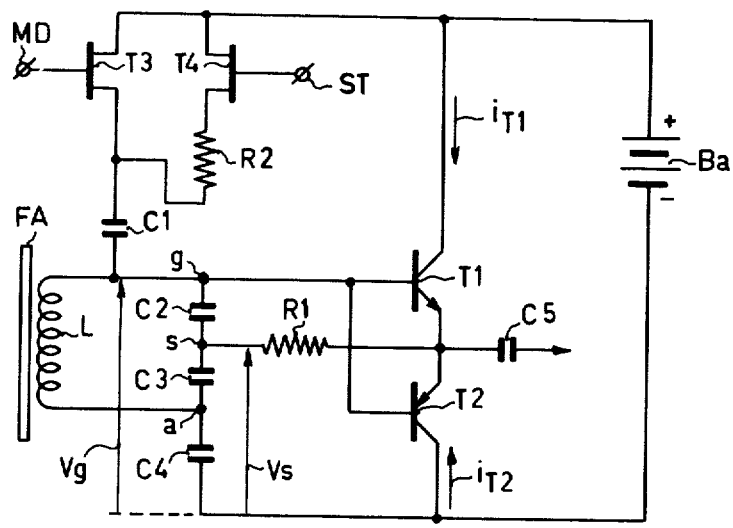
FIG. 2 shows an embodiment of an oscillator which is particularly suitable for the described purpose.

The oscillatory circuit shown in FIG. 2 comprises two transistors T1 and T2 of opposite type, i.e. NPN and PNP.

The emitter electrodes are connected to each other and to the capacitive tapping point $s$ of the oscillatory circuit L-C2-C3 via resistor R1. The collector electrodes of the transistors are connected to the positive and the negative terminal, respectively, of the battery Ba. The main current paths of the transistors, consequently, are connected in series between the poles of the battery. The base electrodes are also connected to each other and to the junction $g$ of inductance L and capacitor C2. The third connection point $a$ of the oscillatory circuit is connected, via capacitor C4, to one of the poles of the battery. Capacitor C4 has a high capacitance, so that the point $a$ is short-circuited for alternating currents with the collector electrodes of the transistors. It is to be noted that there is no further galvanic connection between the terminals of the battery and the emitter electrodes of the transistors. Consequently, these electrodes will assume a floating potential and, due to the unequality of the leakage currents, this potential will be approximately equal to that of one of the battery terminals.

For a better definition of this potential a polarisation voltage can be applied to the electrodes, possibly via resistors of high value, but this constitutes a further loading of the battery and is not necessary in principle. This is because when a signal is induced in the oscillatory circuit, the voltage on C4 changes, due to the diode action of the collector-base junctions of T1 and T2, such that no energy is derived from the battery as long as an amplitude threshold is not exceeded. If the circuit starts to oscillate, the voltage on C4 is quickly adjusted to half the battery voltage. The amplitude of the signal in the oscillatory circuit is then substantially exactly equal to half the battery voltage. After the blocking of the oscillator, the voltage on C4 slowly changes until the original equilibrium has been restored.

Figure 3:
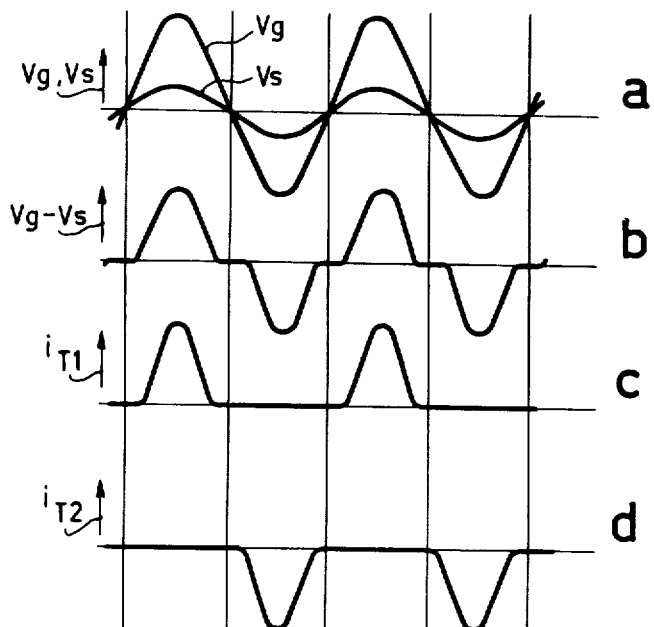
FIG. 3 shows a graph.

The graph of FIG. 3 shows the relationship between the current through the transistors and the voltages on the points $g$ and $s$. If the voltage difference between $g$ and $s$ is zero, both transistors are cut off. If the voltage of the base electrodes is higher than that of the emitter electrodes, the transistor T1 is conducting, but transistor T2 is cut off. If the voltage difference is negative, transistor T2 is conducting and transistor T1 is cut off. Consequently, the transistors will never be conducting at the same time.

Let us assume that no oscillation occurs in the oscillatory circuit.

If an oscillation is then induced in the oscillatory circuit by an interrogation signal, the voltage V$g$-V$s$ (FIG. 3$b$), being the voltage across capacitor C2, alternatively becomes positive and negative. As a result, the transistors T1 and T2 alternatively become conducting, so that in the one half-cycle current is applied to the point $s$ via transistor T1 (FIG. 3$c$), and in the next half-cycle it is derived again via transistor T2 (FIG. 3$d$). Consequently, an alternating current is applied to the point $s$ which does not influence the direct current bias of the transistors. The alternating current flows back to the collector electrodes via the tuned circuit and capacitor C4 and amplifies the oscillation which is present in the oscillatory circuit. Therefore, the oscillator starts to oscillate, a signal then being supplied, via capacitor C5 for controlling the bistable trigger BS and hence the gate P.

For a proper understanding of the operation it is to be noted that, due to the circulating current in the oscillator circuit, the points $g$ and $a$ are in mutual phase-opposition with respect to the point $s$. The points $g$ and $a$ are connected to the base electrodes and the collector electrodes, respectively, while the point $s$ is connected to the emitter electrodes. Consequently, the oscillator is essentially a three-point circuit of the Colpitts type.

The oscillator can alternatively be constructed as a Hartley oscillator by connecting the emitter electrodes to a tapping of the inductance L instead of to the capacitive tapping point S. It is then necessary to ensure, by insertion of a capacitor, that the emitter electrodes have a floating potential which adjusts itself to a value such that both transistors are cut off in the rest state.

The oscillator is frequency modulated by means of the transistor T3 in series with capacitor C1. The modulating signal is applied, via the terminal MD, to the gate of the transistor which is constructed as a field effect transistor.

A transistor of this type operates as a real switch, that is to say currents can flow thereacross in both directions in the conducting state.

The transistor T3 is normally cut off. When it becomes conducting it connects the capacitor C1 parallel to the tuned circuit, as far as alternating currents are concerned, with the result that the frequency is reduced, for example, from 100 kHz to 90 kHz. It is to be noted that then no direct current flows through the transistor T3 and that the direct current biassing of the transistors T1 and T2 is not changed.

At the end of the code series the field-effect transistor T4 becomes conducting under the control of the stop signal on the terminal ST (T3 is cut off at this instant), with the result that the tuned circuit L-C$_2$-C$_3$ is damped by resistor R2 via capacitor C1 and the oscillator returns to the rest state.

What is claimed is:

1. A circuit arrangement for vehicle identification, particularly a transponder for transmitting an encoded signal in response to an interrogation signal, comprising:

a tuning circuit for controlling said transponder having first, second, and third tapping points; and gating means for activating said transponder upon reception of said interrogation signal, comprising terminals for connection of a battery, and two transistors of opposite type connected in series between said terminals, said transistors having emitter electrodes connected to said first point of said tuning circuit, base electrodes connected to each other and to said second point of said tuning circuit, said third point being connected to one of said terminals.

2. An arrangement as defined in claim 1 wherein said tuning circuit is frequency modulated.

3. An arrangement as defined in claim 1, further comprising a field-effect transistor, and an associated capacitor connected in series; said field effect transistor and capacitor serving to frequency modulate said tuning circuit.

* * * * *